United States Patent Office 2,880,742
Patented Apr. 7, 1959

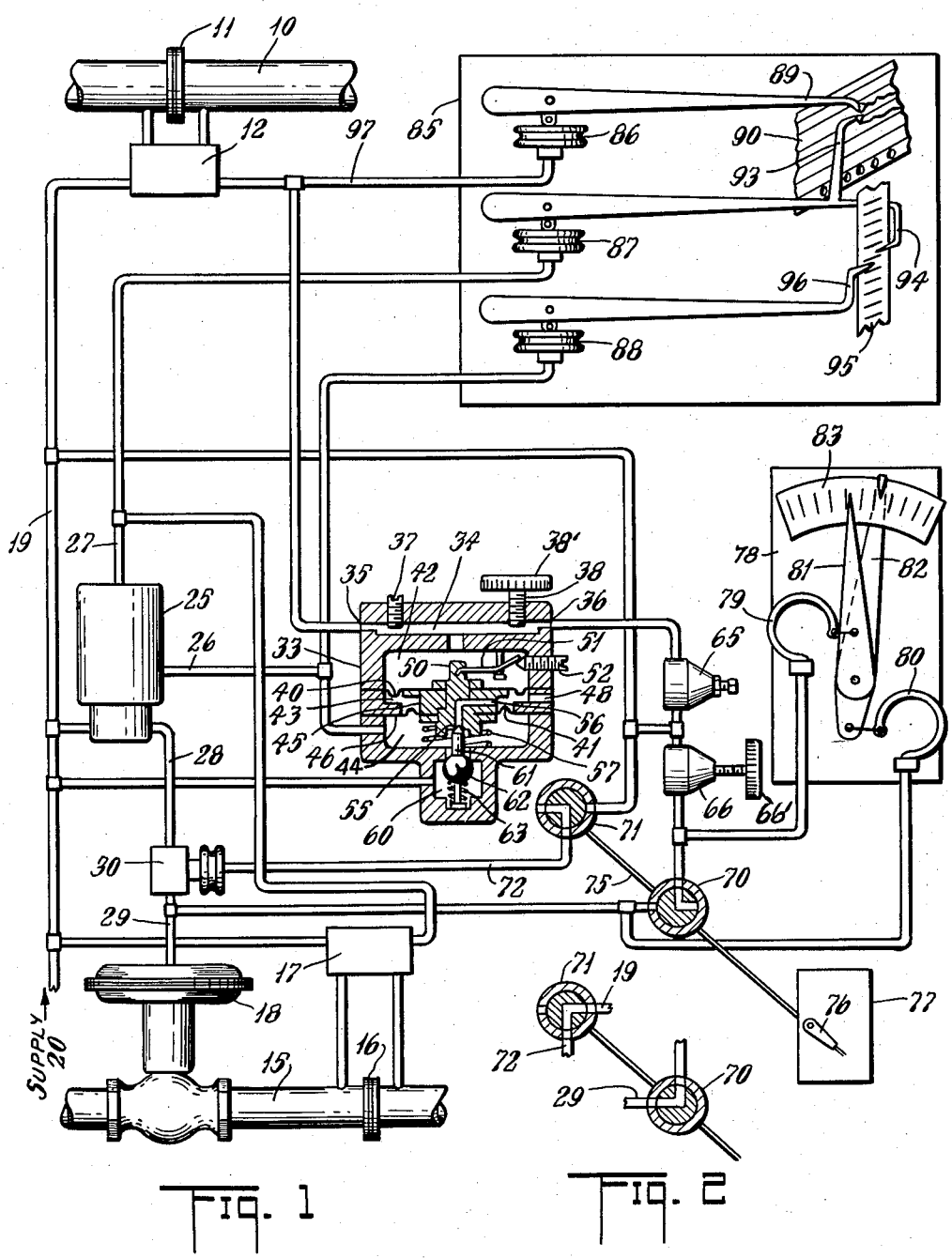

2,880,742

FLUID PRESSURE RATIO CONTROLLER AND CONTROL SYSTEM

William C. Virbila, Watertown, Conn., assignor to The Bristol Company, Waterbury, Conn., a corporation of Connecticut Application July 19, 1956, Serial No. 598,800

12 Claims. (Cl. 137—82)

This invention relates to fluid-pressure-actuated control apparatus, and more especially to a pneumatic control system and means for establishing and maintaining a predetermined ratio between two variables or, precisely, to the regulation of one variable in a manner that said ratio will be maintained between its magnitude and that of another variable whose variations are subject to conditions not under the control of the apparatus incorporating the invention. In many industrial processes, it becomes expedient that, rather than regulate the absolute magnitudes of certain variables, there be maintained between two such variables a fixed ratio so that, instead of regulating apparatus being required to respond to, and endeavor to correct, a variation in one of said quantities, it will take cognizance of such a variation but will proceed to adjust another variable so that a preestablished ratio between the two will be maintained. While controls of this nature find many uses in industry, the most common is unquestionably that of the regulation of flow of one fluid to maintain a predetermined and fixed ratio to that of another, thus making possible a uniform mixture without respect to the volume represented in the latter—and presumably uncontrolled—flow. In chemical processes and in the petroleum industry, such regulation is of especial importance; and it is with a view to such an application that the invention will now be described.

The type of automatic regulating system to which the instrument embodying the principles of the invention is especially applicable is the pneumatic control of the "force-balance" class, embodying four units: (1) a pressure transmitter adapted to develop a fluid pressure representative of the magnitude of a measured variable, (2) a fluid-actuated control valve adapted to regulate the measured variable in accordance with the pressure of an actuating fluid applied thereto, (3) a pressure regulator adapted to receive pressure fluid from a source of supply, and to deliver fluid at an output pressure which may be adjusted at will by means of a mechanical device, (4) a force-balance control unit responsive to the difference between the pressures derived from the transmitter and the pressure regulator and adapted thereby to regulate the fluid pressure applied to the control valve. Such an installation, as well as its component elements, is fully set forth and described in a paper "The Solution of Instrumentation Problems by the Pneumatic Null Balance Method," by C. B. Moore, in the periodical "Instruments," vol. 18 (1945), page 598.

It is an object of the present invention to provide a fluid-pressure-actuated control system adapted to maintain a predetermined ratio between the value of a regulated magnitude and that of a "wild" or independently varying magnitude.

It is a further object to provide a control system of the above nature wherein said ratio may readily be adjusted at will and continuously through a range from values greater than unity to values less than unity.

It is a further object to provide a control system of the above nature wherein substantially linear proportionality may be maintained between the two variables by elimination of the effect thereon of the datum or "set-back" pressure customarily characterizing pneumatic systems.

It is a further object to provide a control system of the above nature adapted to either automatic or manual operation and wherein transfer of function from either method to the other may be effected smoothly and without abrupt change in position of the main control valve.

In carrying out the purposes of the invention, it is proposed to utilize a pressure regulator which embodies a ratio control unit of the force-balance class wherein the desired ratio is established by means of an adjustable pressure-dividing system. The output of said unit thus being representative of the ratio between two magnitudes, rather than of a predetermined constant, the action of the succeeding force-balance control unit (4) is to maintain a regulatory function based upon said ratio instead of on a selected absolute control value.

Since the present invention is directed to a control system based on ratio, rather than upon any absolute value, it is important that due consideration be given to the magnitudes between which said ratio exists. As fully pointed out in the hereinbefore mentioned paper by Moore, linearity of response between the output of a pneumatic transmitter and the measured variable is greatly improved by the transmission of a "live" zero reading when the measured quantity is zero. In other words, while the output pressure of the transmitter will usually rise and fall with corresponding changes in the measured quantity, said pressure must have finite values for all values of the latter. Thus, as the measured magnitude becomes of zero value, the transmitted pressure remains appreciably above zero. This result is attained, as explained in said published paper, by superposing a constant supplementary pressure upon that developed as representative of the quantity under measurement. While there have been some variations in practice, the value of 3 lbs. per square inch has been found satisfactory as a datum; and, in the interest of uniformity, manufacturers and users of such pneumatic control equipment have adopted a standard range of 3 to 15 lbs., the respective limiting pressures representing the extremities of the range of operation, and intermediate values tending to maintain a substantially linear relation of valve positions throughout that range. Thus, where ratios are involved, allowance must be made for the datum pressure and suitable compensation applied where necessary.

Further objects and advantages will be apparent from the following description and the accompanying drawings in which Figure 1 is a diagrammatic representation (partially in section) of a typical control installation embodying the principles of the invention and Figure 2 is a view of a detail of Figure 1, showing certain elements in positions alternative thereto.

Referring now to the drawings, in pipe line or conduit 10 there flows freely a process fluid, whose rate of flow may be continuously determined by means of an orifice-plate 11 or equivalent device inserted in the pipe line and coupled to a differential-pressure-responsive transmitter 12. Similarly, in conduit 15 there flows another process fluid, whose rate of flow may be determined by means of an orifice-plate 16 in combination with a differential-pressure-responsive transmitter 17, and may be regulated by means of a pneumatically actuated control valve 18 connected in said conduit. A principal object of the invention is concerned with maintaining in the pipe line 15 a rate of fluid flow which, over a wide range of values, shall maintain a substantially constant predetermined ratio to the rate of flow in the pipe line 10.

Each of the transmitters 12 and 17 comprises means adapted to develop a fluid pressure representative of the magnitude of a measured variable. In the form shown, each is provided with an inlet connected by means of a conduit 19 to a source 20 of substantially constant air pressure and with an outlet at which appears the correspondingly regulated pressure. Transmitters of this class are well known in the arts of telemetering and automatic control and may be of either the force-balance or the position-balance type. The force-balance type of pressure transmitter is described in the hereinbefore-mentioned paper by Moore in "Instruments," 1945. Alternatively, the position-balance type of transmitter is described in the book "Principles and Methods of Telemetering," by P. A. Borden and G. M. Thynell (Reinhold, 1948), page 191. This device is also shown in British Patent No. 525,674, issued November 21, 1940. Since the pressure differential across a constriction in a fluid-carrying conduit is related to the rate of flow by a quadratic law, the response of the transmitters 12 and 17 will not be inherently linear. In many instances of control to which the present invention is directed, this characteristic is not objectionable; but, should true proportionality be desirable, either or both of the transmitting units may be provided with "linearizing" means well known in the art and forming no part of the present invention.

The control valve 18 is of the conventional type, having a fluid-pressure motor element whereby the degree of opening of said valve, and hence the rate of admission of fluid through the conduit 15, is made subject to the pressure of control fluid applied to said motor element. Regulation of the pressure upon said motor element is effected by means of a control unit 25. Such a unit is described in said paper by Moore. The unit is adapted to respond to the difference between fluid pressures in conduits 26 and 27 connected thereto and, through connection to the conduit 19, to supply from the source 20 to a further conduit 28 an air pressure regulated in accord with said pressure difference. The conduit 28 is connected through a pressure-actuated relay valve 30, to a conduit 29 and, thence, to the motor element of the control valve 18 so that, when said relay valve is open, operation of the valve 18 will be directly subject to the control unit 25. Relay valve 30 is provided with a pressure-sensitive diaphragm of capsular element whereby passage through said valve will be closed when pressure is applied to said element and will be open when said pressure is absent. The fluid pressures which are balanced in the control unit 25 are derived, respectively, from the transmitter 17 through the conduit 27 connected to the outlet thereof and through the conduit 26 connected to the outlet of a ratio-control unit 33 now to be described.

The ratio control unit 33 comprises a body having in combination two more or less discrete elements, a pressure-dividing section somewhat analogous to a voltage-divider in electrical practice, and a differential force-balance relay adapted to respond to a pre-established fixed ratio between applied fluid pressures. Formed within the body of the unit 33 is a cavity 34 having two inlets 35 and 36; the inlet 35 communicating with the cavity through a restriction, which may be normally fixed by adjustment of a screw 37 to a desired position, and the inlet 36 communicating with said cavity through a constriction which may be readily adjusted at will by means of a graduated screw or needle valve 38 having a knob 38'.

The main portion of the body of unit 33 comprises a cylindrical cavity divided by two transverse flexible diaphragm members 40 and 41 into three axially disposed chambers 42, 43, and 44. The diaphragm members 40 and 41 are spaced apart and centrally attached to each other by an axially movable hub member 45, and are peripherally clamped in the body portion of the unit 33. By means either of an inwardly extending annular, centrally perforated, plate 46 or an equivalent flange element, the effective area of the diaphragm 41 is made substantially smaller than that of the diaphragm 40, whereby a given unit pressure in the chamber 42 will exert upon the movable assembly including said diaphragms and the hub 45 a force which can be balanced only by a correspondingly greater unit pressure in the chamber 44. Satisfactory operation of the control system to which the invention is directed has been obtained with the effective area of the diaphragm 41 selected to be one third that of the diaphragm 40.

The chamber 42 is in free communication with the cavity 34, sharing whatever pressure condition may exist therein. The chamber 44 is connected by conduit 26 to one side of the differential pressure-responsive element comprised in the controller 25. The chamber 43, separated from the chambers 42 and 44 by flexible diaphragms 40 and 41, respectively, communicates with the atmosphere through a vent 48 passing through the wall of the unit 33.

The hub member 45 is provided at its extremity which projects into the chamber 42 with an abutment 50 against which is pressed a leaf spring 51 attached to the inside wall of said chamber and adjustable by means of an externally accessible screw 52. The normal influence of the spring is to supplement that of fluid pressure within the chamber 42, tending to move said hub member in an axial direction and in a direction to increase the volume of said chamber. Formed in the portion of hub member 45 which projects into the chamber 44 is a centrally located valve-seat 55 communicating with a passage 56 penetrating the body of the hub and, when open, providing communication between the chamber 44 and the chamber 43, and thus with the atmosphere. A compression spring member 57 positioned within the chamber 44 acts upon the hub member 45 in a sense to supplement fluid pressure in said chamber and to move the hub member 45 in opposition to pressure in the chamber 42 and to the influence of spring 51. As will be more fully pointed out, springs 51 and 57 are so selected and adjusted—by means of the former—as to neutralize the effect of the datum pressure value forming a constant portion of the signal from transmitter 12.

At the extremity of the body of the unit 33 remote from the cavity 34 is a chamber 60 communicating with the chamber 44 through an axially formed passage 61 having a seat portion at the extremity toward the chamber 60. Positioned within the passage 61 is a double seating valve member 62 provided preferably with an enlarged portion of spherical curvature adapted to engage the seating portion of the passage 61 to seal the same from communication with the chamber 60, and also with a conically formed tip portion of reduced diameter extending axially through the chamber 44 and adapted to engage and seal the seat portion 55 of the passage 56 in the hub member 45. The valve member 62 is normally pressed into seating engagement with the passage 61 by means of a light compression spring 63. To the chamber 60 is connected a branch of the conduit 19 whereby to place said chamber in communication with the pressure fluid supply 20.

A reducing pressure regulator 65 is connected with its inlet in communication with the conduit 19 and thereby with the supply 20, and with its outlet in communication with the adjustably restricted connection to the cavity 34 in the body of unit 33. As will hereinafter be explained, the regulator 65 is normally adjusted to a fixed value of pressure output. A reducing pressure regulator 66, provided with a graduated adjusting knob 66' whereby its output pressure may be established at will, is connected with its inlet in communication with the conduit 19 and its outlet to the conduit 29 through a shut-off valve 70. A three-way valve 71 is connected with its common outlet in communication with the operating member of the relay valve 30 through a conduit 72, and, according to its position, to place said conduit in communication with the supply 20 through conduit 19, or to shut off said supply and vent said conduit to the atmosphere. Valves 70 and 71 are mechanically interconnected, as by a common shaft 75 so as to operate as a unit; and this shaft is provided with a pointer or index 76 adapted to indicate on a suitable dial-plate 77 which of the possible operating combinations is established by said valves. Automatic control will be obtained with the valves set as in Figure 1, while the combination shown in Figure 2 provides for manual operation.

A double-element pressure gauge 78 is provided with pressure-responsive elements 79 and 80 operatively connected to the inlet and to the outlet, respectively, of the valve 70 and also to pointers 81 and 82 adapted to cooperate with a common graduated scale 83 in providing indications, respectively, of the outlet pressure of the regulator 66 and of the pressure applied to the motor element of the main control valve 18.

Indicating and recording means of the general class set forth in my copending application Serial No. 401,634, filed December 31, 1953, is embodied in an instrument 85 comprising three pressure-responsive elements 86, 87 and 88. Pressure-sensitive element 86 is provided with a pen or stylus 89 adapted to produce a continuous record on a moving graduated chart 90. Element 87 is similarly provided with a stylus 93 for producing a record on said chart and also with an index or pointer 94 adapted to cooperate with a graduated stationary scale 95 to indicate the pressure applied to the element 87. Element 88 is provided with an index 96 having a path juxtaposed to that of index 94 to indicate on the scale 95 the pressure in the element 88. A conduit 97 provides communication between the outlet of transmitter 12, the inlet 35 of relay control unit 33, and the pressure-sensitive element 86 of the instrument 85. The pressure-sensitive element 87 is in communication with the conduit 27. Thus, there may be obtained on the chart 90 a simultaneous record of the flow values in the pipe lines 10 and 15, respectively. The pressure-sensitive element 88 is placed in communication with the conduit 26, providing on the scale 95 an indication of the outlet pressure of the unit 33. Thus, the relative position of the pointers 94 and 96 will provide a comparison of the opposed pressures in the control unit 25.

In order to obtain a clear comprehension of the performance of the control system embodying the principles of the invention, consideration may first be given to that of the ratio control unit 33. Pressure in the chamber 34 will assume a value determined by the "signal" pressure from the transmitter 12—which includes a datum pressure to provide a live zero, in the present instance 3 lbs. p.s.i.—applied at the inlet 35 and a constant pressure corresponding to said datum from the regulator 65 at the inlet 36, and upon the relative setting of the restrictions in said respective inlets. If either restriction is closed, the pressure in the chamber will assume the value of that applied at the other inlet. If both restrictions be partially open, the internal pressure will attain an intermediate value since this portion of ratio control unit 33 functions as a pressure divider. Consequently, with zero flow in conduit 10 and a 3 p.s.i. signal pressure at inlet 35 corresponding to the datum, the pressure in chamber 34 is 3 p.s.i. for all positions of valve 38 in the inlet 36. For pressure values greater than the datum the flow of fluid from chamber 34 through inlet 36 toward regulator 65 and the resultant pressure in chamber 34 depend upon the setting of valve 38. Carefully conducted tests have shown that, with a fixed restriction in the inlet 35 receiving the signal pressure and a variable restriction in the inlet 36, the intermediate pressure in the chamber 34 will vary substantially linearly with the signal pressure and that this linearity will be maintained through a wide range of ratios as the variable restriction is adjusted to different degrees of opening.

In the operation of the pneumatic relay 33, air from the source 20 is admitted through the conduit 19 to the small chamber 60, passing thence around the spherical seating portion of the valve member 62 through the passage 61 into the chamber 44 beneath the diaphragm 41 and exerting thereon a force opposing that applied upon the diaphragm 40. If the force upon the diaphragm 41 exceeds that upon the diaphragm 40, the assembly comprising said diaphragms and the hub member 45 will be axially displaced in a sense to allow the valve member 62 under the influence of the spring 63 to close the passage 61 and, at the same time, to free the seat portion 55 of the passage 56 and permit air to escape to the chamber 43 and thence to the atmosphere. Thus, the pressure in the chamber 44 will be reduced. Similarly, should the force on the diaphragm 40 predominate, a converse action takes place, with a resultant tendency for the pressure in the chamber 44 to be increased. The pressure in the chamber 44, with which communicates the conduit 26, will thus tend to be maintained at a value proportional to that in the chamber 42, which, as previously explained, is identical with that in the chamber 34. With the area of the diaphragm 41 substantially smaller than that of the daphragm 40, the unit pressure in chamber 44 will of necessity be correspondingly greater than in chamber 42 to establish a condition of balance. Thus, with the selected 1/3 ratio as described, the outlet pressure of the relay 33 will be of the order of three times that existing in the chambers 34 and 42, both pressures corrected for the datum pressure, except for signal pressures equal to the datum or "zero" signal in which case the outlet pressure will be equal to that in chambers 34 and 42.

The compression spring 57 and the adjustable leaf spring 51, acting in opposition upon the hub member 45, provide adjustment of the neutral setting of the relay and enable proper cognizance to be taken of the constant factors in the fluid pressures involved. In practice, spring 57 is preferably selected such that hub 45 is urged upward (as viewed in Figure 1) beyond the neutral point corresponding to the preselected datum. Initial adjustment of the relay 33 is effected by first establishing a pressure equivalent to the selected datum (3 lbs.) in the chamber 42. This corresponds to a zero value of the magnitude measured at the transmitter 12. Under this condition, the force of the spring 51 is then adjusted by means of the screw 52 until the relay maintains a pressure of 3 lbs. at its outlet, thus providing the required datum pressure for application to the controller 25 through the conduit 26. It is apparent, therefore, that the combined action of springs 51 and 57 upon hub 45 is to make available the predetermined datum pressure in chamber 44 corresponding to a zero value of the magnitude measured at transmitter 12.

It is apparent that an intermediate pressure $P_i$ is established in chambers 34 and 42 such that $$P_i = P_0 R + P_d \tag{1}$$

where $P_0$ is the pressure of the fluid admitted through inlet 35 less $P_d$, the datum pressure, and R is the value of the ratio $(P_0-P_x)/P_0$ with $P_x$ equal to the drop in pressure in chambers 34 and 42 below that of the fluid at inlet 35 due to the passage of fluid outward from chamber 34 through inlet 36. By adjustment of the setting of variable restriction 38 the value of ratio R takes on desired values ranging from unity down to nearly zero, $R=1$ corresponding to restriction 38 being fully closed and R minimum corresponding to restriction 38 being fully open. It is also apparent that the output pressure $P_m$ provided at the outlet of chamber 44 to conduit 26 may be stated as $$P_m = MRP_0 + P_d \tag{2}$$

with M being the multiplication introduced by the relationship between the diaphragms 40, 41 and $P_d$ being the minimum pressure maintained in chamber 44 due to the gating of vent 48 and inlet 61 when the datum pressure only is present in chamber 42 and is balanced by the resultant force of opposed springs 51, 57.

Consideration may now be given to operation of the control system as a whole. With the valve 71 set as shown in Figure 1, the operating element of the relay valve 30 will be vented to the atmosphere, so that said valve will stand open, providing free communication between the conduits 28 and 29, and thus between the outlet of the controller 25 and the motor element of the main control valve 18. The pressure applied to said motor element will also be impressed upon the pressure-sensitive element 80 of the gauge 78 and indicated on the scale 83 by the index 82. The "wild" flow through the conduit 10 will be represented by a pressure in the conduit 97, which will be continuously recorded on the chart 90 by the stylus 89. As hereinbefore pointed out, there will be impressed upon the controller 25 through the conduit 26 a pressure representative of the flow in the conduit 10, i.e., proportional to said flow, plus a constant datum pressure of 3 lbs.

The transmitter 17, acting in accordance with the well-known principles of pneumatic controls, will apply to the controller 25 through the conduit 27 a pressure similarly representative of the flow in the conduit 15. Thus, the controller 25 will tend to modulate its outlet pressure in the conduit 28 according to the differences of said pressures in the conduits 26 and 27, respectively; and, by suitable selection and adjustment of components, the valve 18, responsive to said controller outlet pressure, may be caused to vary the flow in the conduit 15 in a manner to tend toward a condition of balance between said opposed pressures and, thus, to maintain toward the flow in conduit 10 a definite ratio established by the ratio relay 33.

As hereinbefore pointed out, a linear relationship between pressure in the conduit 26 and the magnitude measured at the transmitter 12 may be maintained through a wide range of ratios as the restriction 38 is progressively adjusted. Since, however, the unit pressure upon the diaphragm 40 can never be greater than that in the conduit 97, it follows that, if the diaphragm 41 were of the same dimensions as the diaphragm 40, the ratio between unit pressures on the two sides of the diaphragm assembly could be in one direction only and could never pass through a value of unity. Making the effective area of the diaphragm 41 smaller than that of the diaphragm 40 circumvents this objection and makes it possible for the ratio to "cross over," as is frequently desirable in this class of control. With the areas of the respective diaphragms having a ratio of 1/3 as set forth by way of example, it follows that, in order for a balance to be effected, the unit pressure on diaphragm 41 must be three times that on diaphragm 40. Thus, in order to obtain a 1/1 ratio between the values measured at the respective transmitters 12 and 17, the unit pressure in the chambers 34 and 42 would require to be reduced to 1/3 of that at the outlet of the transmitter 12; and, since adjustment of the restriction 38 will permit said unit pressure to be set in a range either above or below a value of 1/3 the signal pressure, it follows that the overall ratio obtainable from the control system may be adjusted through a range above and below unity.

Transfer of control from automatic to manual is effected by throwing the valves 70 and 71 from the positions shown in Figure 1 to those shown in Figure 2. Valve 71 places the actuating element of the relay valve 30 in communication with supply pressure, causing said relay valve to close, interrupting communication between conduits 28 and 29, whereby the valve 18 is made insensitive to the influence of the controller 25. At the same time, valve 70 connects the conduit 29 to the output of the manually adjustable regulator 66, whereby the setting of the control valve 18 may be regulated at will.

"Bumpless" transfer of control from automatic to manual, or vice versa, may readily be effected by the use of the indicating pointers on the instruments 78 and 85, respectively. In order to transfer from automatic to manual control, the regulator 66 is first adjusted until the position of the pointer 81 in the instrument 78 agrees with that of the pointer 82. Thus, without respect to the actual reading of these pointers, the outlet pressure of the regulator 66 will be the same as that existing in the conduit 29; and, upon turning the valves 70 and 71 from the position shown in Figure 1 to that of Figure 2, the transfer of functions will be effected smoothly and without any abrupt change in the position of the main control valve 18. Since the conduits with the respective pointers 81 and 82 will be in direct communication with each other through the valve 70, said pointers will coincide in their indications so long as manual control is maintained.

Transfer from manual to automatic control is effected by first adjusting the setting of the valve 18 by means of the pressure regulator 66 until pressure in the conduit 27, representing the resultant flow through the conduit 15, is equal to that in the conduit 26, as indicated by coincidence between the pointers 94 and 96 in the instrument 85. Under this condition, the pressure in the conduit 28 will be the same as that in the conduit 29, and change-over may be smoothly obtained by shifting the valves 70 and 71 from the positions of Figure 2 to the positions shown in Figure 1.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. In a fluid-pressure-actuated control system having means for providing an input pressure corresponding to the value of a variable magnitude plus a predetermined constant datum pressure, means for establishing an intermediate pressure such that it, less said datum pressure, is in a predetermined ratio to that portion of said input pressure in excess of said datum pressure, and means for multiplying only that portion of said intermediate pressure in excess of said datum pressure by a predetermined constant and thereby provide an output pressure which is the sum of said datum pressure plus the product of said portion of said input pressure by said ratio and by said constant.

2. In a fluid-pressure-actuated control system having means for providing an input pressure corresponding to the value of a variable magnitude plus a predetermined constant datum pressure representing a zero value of said magnitude, means for establishing an intermediate pressure, such that it, less said datum pressure is in a predetermined ratio to that portion of said input pressure in excess of said datum pressure, means for selectively varying said ratio over a range which extends from approximately zero to no greater than unity, and means for multiplying only that portion of said intermediate pressure in excess of said datum pressure by a predetermined constant and thereby provide an output pressure which is the sum of said datum pressure plus the product of said portion of said input pressure by said ratio and by said constant.

3. In a fluid-pressure-actuated control system having transmitting means for providing at an outlet thereof a first fluid pressure corresponding to the value of a variable magnitude plus a predetermined datum pressure representing a zero value of said magnitude, means defining a first chamber having a first inlet communicating with said transmitting means outlet, said first chamber having a second inlet, means defining a second chamber having a vent communicating with the atmosphere, an outlet and a third inlet for communication with a source of fluid under pressure, means for providing at said second inlet a fluid pressure equal to said datum pressure whereby fluid passes out of said first chamber through said second inlet when said first fluid pressure is greater than said datum pressure, means for selectively varying the effective size of said second inlet relative to said first inlet and thereby the ratio of that portion of the pressure in said first chamber in excess of said datum pressure to the portion of said first fluid pressure in excess of said datum pressure, and means responsive to the differential pressure between said chambers, less said datum pressure, for gating said third inlet and said vent whereby to provide at said second chamber outlet an output pressure which is the sum of said datum pressure plus the product of said portion of the pressure in said first chamber in excess of said datum pressure by a predetermined constant.

4. A fluid pressure ratio controller; comprising means defining a first chamber, first inlet communicating with said first chamber and adapted for connection to a source of signal pressure fluid having a predetermined datum pressure, a second inlet communicating with said first chamber and adapted to be connected to a source of fluid at a pressure equal to said datum pressure; means for varying the effective size of said second inlet relative to said first inlet and thereby the ratio of that portion of the pressure in said first chamber in excess of said datum pressure to the portion of said signal pressure in excess of said datum pressure; means forming a second chamber, first and second outlets and a third inlet all communicating with said second chamber, said third inlet being adapted for communication with a source of pressure fluid; displaceable means for controlling the flow of pressure fluid through said second outlet and said third inlet, said displaceable means having a predetermined effective area exposed to the pressure in said first chamber and having an effective area exposed to pressure fluid from said third inlet different from said predetermined effective area and forming a predetermined second ratio therewith; and means for biasing said displaceable means in a direction to oppose the pressure in said first chamber to an extent equal to said datum pressure; whereby to provide at said first outlet an output pressure which is the sum of said datum pressure plus the product of the portion of signal pressure in said first chamber in excess of said datum pressure by said second ratio.

5. A fluid pressure ratio controller, comprising a casing forming a first chamber adapted for communication through a first inlet with a source of signal pressure fluid having a predetermined datum pressure and through a second inlet with a source of fluid at a pressure equal to said datum pressure, means for varying the effective size of said second inlet relative to said first inlet and thereby the ratio of that portion of the pressure in said first chamber in excess of said datum pressure to the portion of said signal pressure in excess of said datum pressure, said casing forming a second chamber adapted for communication through a third inlet with a source of pressure fluid and having a first outlet and a vent, displaceable means responsive to the pressure in said first and second chambers and for gating the passage of pressure fluid through said third inlet and said vent, said displaceable means having a predetermined effective area exposed to the pressure in said first chamber and another effective area exposed to the pressure in said second chamber, said effective areas forming a predetermined second ratio, and means for biasing said displaceable means in a direction to oppose the pressure in said first chamber to an extent equal to said datum pressure, whereby to provide at said first outlet an output pressure which is the sum of said datum pressure plus the product of the portion of said signal pressure in said first chamber in excess of said datum pressure by said second ratio.

6. A fluid pressure ratio controller, comprising a hollow casing, a pair of spaced flexible members secured to said casing and extending transversely therein, a movable member secured to said flexible members and movable therewith, said movable member and flexible members forming first, second and third chambers in said casing, said casing having a first inlet communicating with said first chamber and adapted for communication with a source of signal pressure fluid having a predetermined datum pressure, said casing having a second inlet communicating with said first chamber and adapted for communication with a source of fluid at a pressure equal to said datum pressure, means for varying the effective size of said second inlet relative to said first inlet and thereby the ratio of that portion of the pressure in said first chamber in excess of said datum pressure to the portion of said signal pressure in excess of said datum pressure, said casing having a vent formed therein communicating with said second chamber, said movable member having a passage providing communication between said second and third chambers, said movable member and one of said flexible members having a predetermined effective area responsive to the pressure in said first chamber and said movable member and the other flexible member having a second effective area responsive to the pressure in said third chamber and forming a predetermined second ratio with said predetermined effective area, said casing having an outlet communicating with said third chamber and a third inlet communicating with said third chamber and adapted for communication with a source of pressure fluid, valve means for gating the passage of pressure fluid through said third inlet and into said passage in accordance with the position of said movable member assumed in response to the pressure in said first and third chambers, and means for biasing said movable member in a direction to oppose the pressure in said first chamber to an extent equal to said datum pressure.

7. A fluid pressure ratio controller, comprising a hollow casing, a pair of spaced flexible members secured to said casing and extending transversely therein, a movable member secured to said flexible members and movable therewith, said movable member and flexible members forming first, second and third chambers in said casing, said casing having a first inlet communicating with said first chamber and adapted for communication with a source of signal pressure fluid having a predetermined datum pressure, said casing having a second inlet communicating with said first chamber and adapted for communication with a source of fluid at a pressure equal to said datum pressure, means for varying the effective size of said second inlet relative to said first inlet and thereby the ratio of that portion of the pressure in said first chamber in excess of said datum pressure to the portion of said signal pressure in excess of said datum pressure, said casing having a vent formed therein communicating with said second chamber, said movable member having a passage providing communication between said second and third chambers, said movable member and one of said flexible members having a predetermined effective area responsive to the pressure in said first chamber and said movable member and the other flexible member having a second effective area responsive to the pressure in said third chamber and forming a predetermined second ratio with said predetermined effective area, said casing having an outlet communicating with said third chamber and a third inlet communicating with said third chamber and adapted for communication with a source of pressure fluid, valve means for gating the passage of pressure fluid through said third inlet and into said passage in accordance with the position of said movable member assumed in response to the pressure in said first and third chambers, means for biasing said movable member in a direction to oppose the pressure in said first chamber to an extent greater than said datum pressure, and adjustable means for urging said movable member in a direction to oppose said biasing means whereby the resultant force urging said movable means in opposition to the pressure in said first chamber is adjustable to a value equal to said datum pressure.

8. In a fluid pressure control system for controlling the value of a dependent variable at a desired ratio of an independently varying quantity, first means for producing a first fluid pressure above a predetermined datum pressure representative of said independent quantity, pressure multiplying means responsive to said first fluid pressure for producing at an outlet thereof a second fluid pressure which is the sum of said datum pressure plus the product of the portion of said first fluid pressure in excess of said datum pressure by a predetermined ratio, said pressure multiplying means including means for selectively varying said ratio over a range which includes values greater and less than unity, second means for producing a third fluid pressure above said datum pressure representative of said dependent variable, control means sensitive to said second and third fluid pressures having an outlet and responsive to the difference of said second and third fluid pressures for producing at its outlet a fourth fluid pressure representative of said difference, and means responsive to said fourth fluid pressure for controlling said dependent variable in accordance therewith.

9. In a fluid pressure control system for controlling the value of a dependent variable at a desired ratio of an independently varying quantity, first means for producing a first fluid pressure above a predetermined datum pressure representative of said independent quantity, pressure multiplying means responsive to said first fluid pressure for producing at an outlet thereof a second fluid pressure which is the sum of said datum pressure plus the product of the portion of said first fluid pressure in excess of said datum pressure by a predetermined ratio, said pressure multiplying means including means for selectively varying said ratio over a range which includes values greater and less than unity, second means for producing a third fluid pressure above said datum pressure representative of said dependent variable, control means sensitive to said second and third fluid pressures having an outlet and responsive to the difference of said second and third fluid pressures for producing at its outlet a fourth fluid pressure representative of said difference, third means responsive to said fourth fluid pressure for controlling said dependent variable in accordance therewith, a first conduit adapted to carry fluid at said second pressure and to admit the same to said control means, a second conduit adapted to carry fluid at said third pressure and to admit the same to said control means, a third conduit adapted to carry fluid at said fourth pressure and communicating with the outlet of said control means and said third means, an adjustable regulator adapted to produce a fifth fluid pressure adjustable at will, a fourth conduit adapted to carry fluid at said fifth pressure, means operable at will for interrupting communication between said control means and said third means along said third conduit and for coupling said third conduit with said adjustable regulator, and individual pressure-responsive deflectable elements connected to said first, second, third and fourth conduits respectively and having discrete exhibiting members deflectable in proportion to the respective pressures therein with the exhibiting members corresponding to said first and second conduits in their excursions following substantially a common path whereby at any portion of their path their deflected positions may be compared and matched and the exhibiting members corresponding to said third and fourth conduits in their excursions following substantially a common path whereby at any portion of their path their deflected positions may be compared and matched.

10. In a fluid pressure control system for controlling the value of a dependent variable at a desired ratio of an independently varying quantity, first means for producing a first fluid pressure above a predetermined datum pressure representative of said independent quantity, pressure multiplying means responsive to said first fluid pressure for producing at an outlet thereof a second fluid pressure which is the sum of said datum pressure plus the product of the portion of said first fluid pressure in excess of said datum pressure by a predetermined ratio, said pressure multiplying means including means for selectively varying said ratio over a range which includes values greater and less than unity, second means for producing a third fluid pressure above said datum pressure representative of said dependent variable, control means sensitive to said second and third fluid pressures having an outlet and responsive to the difference of said second and third fluid pressures for producing at its outlet a fourth fluid pressure representative of said difference, third means responsive to said fourth fluid pressure for controlling said dependent variable in accordance therewith, an adjustable regulator adapted to produce a fifth fluid pressure adjustable at will, and means operable at will for isolating said control means from said third means and coupling said third means with said adjustable regulator.

11. In a fluid pressure control system for controlling the value of a dependent variable at a desired ratio of an independently varying quantity, first means for producing a first fluid pressure above a predetermined datum pressure representative of said independent quantity, pressure multiplying means responsive to said first fluid pressure for producing at an outlet thereof a second fluid pressure which is the sum of said datum pressure plus the product of the portion of said first fluid pressure in excess of said datum pressure by a predetermined ratio, said pressure multiplying means including means for selectively varying said ratio over a range which includes values greater and less than unity, second means for producing a third fluid pressure above said datum pressure representative of said dependent variable, control means sensitive to said second and third fluid pressures having an outlet and responsive to the difference of said second and third fluid pressures for producing at its outlet a fourth fluid pressure representative of said difference, third means responsive to said fourth fluid pressure for controlling said dependent variable in accordance therewith, an adjustable regulator adapted to produce a fifth fluid pressure adjustable at will, and means comprising a pressure-actuated cut-off valve for isolating said control means from said third means, a first two-position valve having a first position operatively connecting said cut-off valve to a pressure supply and a second position connecting the operating means of said cut-off valve to the atmosphere, a second two-position valve having a first position connecting said adjustable regulator to said third means and a second position for interrupting said connection, and manual switch means for simultaneously shifting said first and second two-position valves between their first and second positions.

12. In a fluid-pressure-actuated control system having means for providing an input pressure corresponding to the value of a variable magnitude plus a predetermined constant datum pressure, means for establishing an intermediate pressure such that it, less said datum pressure, is in a predetermined ratio to that portion of said input pressure in excess of said datum pressure, means for multiplying only that portion of said intermediate pressure in excess of said datum pressure by a predetermined contant, and means for establishing an output pressure which is equal to the sum of a datum pressure plus the product of said portion of said input pressure by said ratio and by said constant.

References Cited in the file of this patent

UNITED STATES PATENTS

| | | |
|---|---|---|
| 2,771,897 | Bailey | Nov. 27, 1956 |
| 2,785,696 | Le Van | Mar. 19, 1957 |
| 2,788,013 | Jordon | Apr. 9, 1957 |